Sept. 1, 1942.    C. T. JACKSON    2,294,665
TYPEWRITING MACHINE
Filed Feb. 1, 1940
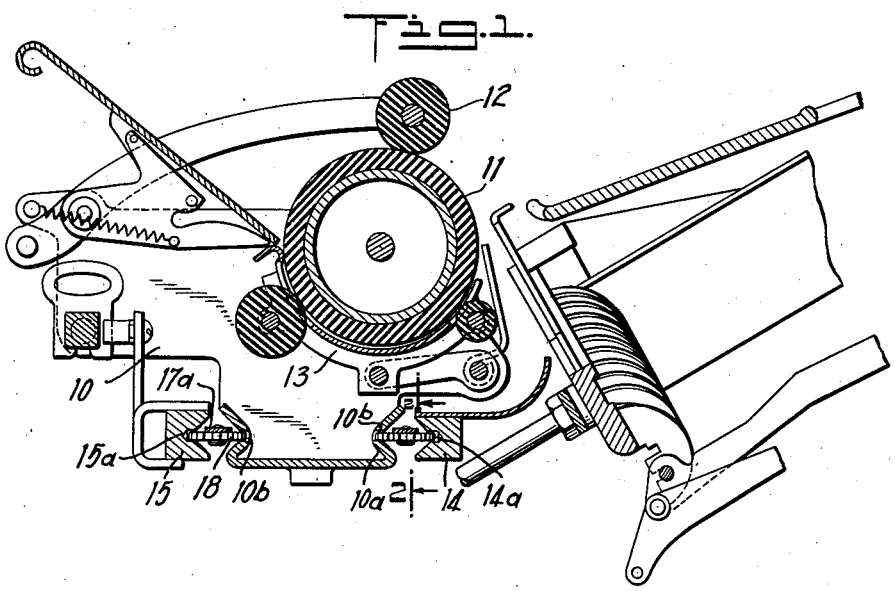
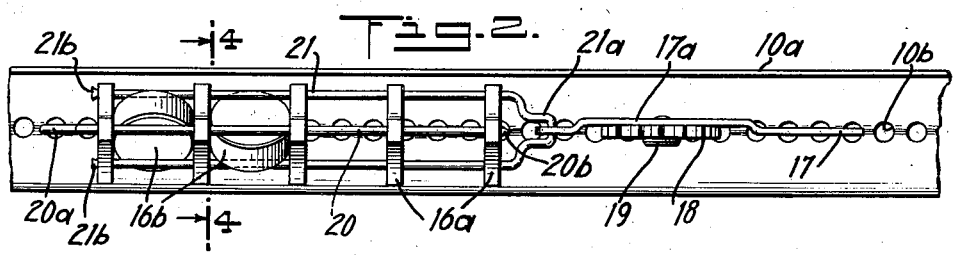
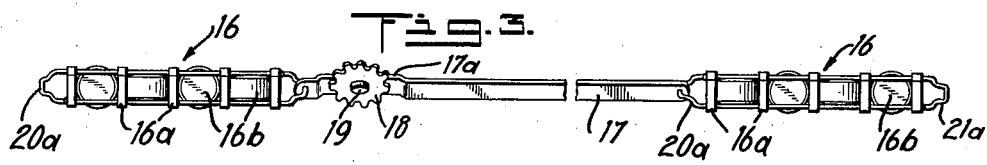
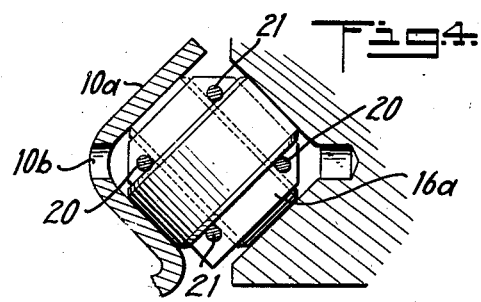
INVENTOR
Carlton T. Jackson
BY
ATTORNEY Patented Sept. 1, 1942

2,294,665

UNITED STATES PATENT OFFICE 2,294,665

TYPEWRITING MACHINE

Carlton T. Jackson, Rochester, N. Y., assignor to International Business Machines Corporation, New York, N. Y., a corporation of New York Application February 1, 1940, Serial No. 316,775

9 Claims. (Cl. 308—6)

This invention relates to improvements in the construction of bearings for the carriages of typewriting machines.

An object of the present invention is to provide an improved carriage bearing.

An object is to provide a bearing which eliminates the pitting of the grooves in the rails and in the carriage which receive and guide the usual anti-friction rollers on which the carriage is mounted.

An object is to provide an improved bearing which has a longer life than has been obtainable heretofore.

An object is to provide a bearing which is less costly to assemble and which is more easily replaced.

An object is to provide a bearing in which it is not necessary to replace the entire roller truck or carrier but merely the rollers themselves whenever the bearing becomes worn.

An object is to provide a bearing in which the rollers are made of plastic material and are not required to be heat treated whereby to reduce the cost of manufacture of the rollers.

An object is to provide a bearing in which the anti-friction rollers are more resilient in comparison with the rollers of prior constructions to enable the rollers to absorb shock and to quiet the movement of the carriage.

An object is to provide a bearing which may be readily enlarged to correspond with the length of the carriage.

An object is to provide a bearing which is constructed on a unit basis whereby the length of the bearing may be readily increased to suit longer carriages.

An object is to provide a bearing which eliminates to a very large extent expensive precision grinding operations on rollers heretofore necessary with bearings having hardened steel rollers.

An object is to provide a bearing which is particularly well suited to the severe operating conditions found in power operated machines arising from the use of power to return the carriage at the end of a line.

Other objects of the invention will be pointed out in the following description and claims and illustrated in the accompanying drawing, which discloses, by way of example, the principle of the invention and the best mode, which has been contemplated, of applying that principle.

In the drawing:

Fig. 1 is a section through the carriage of a typewriting machine taken transversely of the rails on which the carriage is mounted.

Fig. 2 is an enlarged vertical section on the line 2—2 in Fig. 1 showing one of the roller truck units and a portion of the connecting link.

Fig. 3 is a view of the assembled bearing showing two roller truck units and the link connecting the units.

Fig. 4 is a vertical section on the line 4—4 in Fig. 2.

Fig. 1 illustrates a vertical section of a portion of the carriage of a power operated typewriter such as the "International," formerly known as the "Electromatic." However, it will be understood that the invention is not limited to power operated typewriters, although by virtue of certain features of construction hereinafter to be brought out in detail, the improved bearing described herein is particularly well suited to a power operated typewriter. In Fig. 1, the reference numeral 10 generally designates the carriage on which the usual platen 11 is rotatably mounted. Cooperating with the platen are the usual paper bail 12, the paper deflector and pressure roller assembly 13. The carriage is mounted on front rails 14 and rear rails 15 by means of anti-friction roller trucks which in the present case comprise the invention claimed hereinafter.

Heretofore in this art, it has been customary to make the rails 14 and 15 of cast iron and to machine grooves therein which confront similar grooves in the carriage. Riding in these grooves there is usually provided anti-friction roller trucks which ordinarily consist of a relatively rigid roller or ball retaining element which is suitably apertured to receive balls or rollers made of hardened steel. In the most common form of truck, the rollers are pivoted on fixed pivots secured in the body of the member which is apertured to receive the rollers. In order to facilitate assembly and to avoid loss of the rollers when the carriage is removed for servicing, it is customary to retain the rollers permanently in place in the apertures of the rigid member by means of the pivots secured thereto. Usually the member retaining the rollers is relatively rigid and inflexible and incapable of adjusting itself to any material extent to irregularities in the surface of the rails or the cooperating walls of the grooves of the carriage in which the rollers travel. One of the most common forms of roller truck comprises a tube in which the rollers are disposed in a plurality of pairs with the rollers of each pair pivoted on studs which are disposed at right angles to each other. Naturally it is highly desirable in the construction of this type that the pivots for the rollers be maintained at right angles to each other and that the tubular member be straight, otherwise binding of the rollers and hence sluggishness of movement of the carriage is likely to result. Also excessive wear results due to failure of the rollers to rotate freely at all times. Furthermore, the rollers seldom divide the load of the carriage equally.

A bearing of the foregoing type in fairly satisfactory in a manual machine in which the carriage is always returned by hand as the operator usually is reasonably careful not to return the carriage at an excessive speed. In power operated machines, however, the speed of return of the carriage is not dependent upon muscular effort of the operator, but is dependent upon the speed of the motor which operates the carriage returning mechanism. The carriage is usually returned by power at a much higher speed than is possible in manually operated machines. Bearings, as described above, usually are provided with a small pinion which has its teeth cooperating with holes drilled transversely of the grooves in the carriage and in the rails in order to compel the bearings to travel between predetermined limits and prevent creepage of the bearing which ultimately would result in the bearing passing beyond one end of the coacting rail and dropping out of the machine. Owing to this feature of construction, when the carriage marginal stops are set to arrest the carriage at a predetermined point, the rollers always stop at the same point on the rail. When the carriage is arrested by the marginal stop, in consequence of the driving power of the returning mechanism, the carriage has a tendency to "buck" which tends to force the hardened steel rollers forming the bearing always into the same spot on the rails. Alternately the rails become pitted and damaged at said spots and a looseness in the bearing develops which it is impossible to correct without making the bearing too tight at other points in the carriage travel. This pitting is primarily due to the fact that the rails are made of cast iron and are quite soft in comparison with the rollers which are usually hardened steel.

There are other objections to bearings of the type described above in which the rollers are held in a rigid retainer or truck, such as excessive wear due to the inflexibility of the retainer which makes it impossible for the rollers to accommodate themselves to irregularities in the rails such as the pits formed by the continual stoppage of the carriage at a particular point. The pitting of the rails is rather an expensive matter as the rails themselves must be fairly accurately machined. It is also not a very easy matter, when replacing the rails, to obtain smoothness of operation of the carriage because there are always present inequalities in the balls or rollers themselves which makes it very difficult to maintain exactly the proper clearance between the rollers and rails and still have the carriage roll free with no appreciable looseness at any point in the movement. Any looseness of the carriage obviously cannot be tolerated because in a power operated typewriter the type bars strike with considerably greater force than in the manual machines owing to the high speed of operation and the impact of the type on the platen would tend to make the carriage vibrate excessively.

The improved bearing forming the subject of the present invention is most clearly shown in Figs. 2, 3, and 4. Essentially the bearing consists of a plurality of separate bearing units, each including a cage for loosely retaining the rolling elements such as rollers, pivotally joined together to form a train.

In Figs. 2 and 4, the reference numeral 10a designates the grooved portion of the carriage which, with the groove in rail 14, serves as a raceway or guide for the bearing unit. A complete bearing may include three units consisting of two roller truck assemblies, generally designated 16 (Fig. 3), and a connecting link 17, forming a train. The connecting link 17 may be formed from flat strip stock having an offset portion 17a (Fig. 3) to accommodate the pinion 18 which rotates freely on a fixed stud 19 on link 17. The offset portion 17a is designed so that the plane of the pinion 18 coincides with the plane of bulk of link 17. As shown in Figs. 1 and 2, the teeth of pinion 18 cooperate with holes 10b formed in the grooved portion 10a of the carriage and also with holes 14a, 15a formed in the rails 14, 15 at intervals corresponding with the spacing of the teeth whereby the holes 10b, 14a, 15a act like racks to rotate the pinion 18 and thus cause the bearing assembly to travel at half the speed of the carriage and therefore to move half the distance moved by the carriage as well known in the art.

The bearing units 16 are identical in construction, therefore a description of one will suffice for both. Each unit comprises a plurality of separator plates 16a of which there is one more than the number of rollers 16b in the unit. The number of rollers 16b is largely a matter of choice but it has been found by experience that four rollers in each unit give very satisfactory results with a twelve inch carriage. The separator plates 16a may be made of a relatively soft material such as aluminum, and are lozenge-shaped but one of the corners is uncut as best shown in Fig. 4. The uncut corner is for the purpose of facilitating assembly of the separator plates.

These separator plates 16a are provided with four holes located near the corners of the plates through which holes pass retaining wires 20, 21 of which there are two for each unit. Each of these retaining wires is substantially U-shaped with two parallel straight branches and a looped portion 20a or 21a. The straight portions of the retaining wires 20, 21 pass through diagonally opposite holes in the plate 16a, as best shown in Figs. 2 and 4 and are so arranged that the loop 20a in the retaining wire 20 is located at the opposite end of the bearing unit to the loop 21a in retaining wire 21. It is thus possible to assemble additional bearing units 16 at the ends of the train of units shown in Fig. 3 to adapt the bearing to longer or heavier carriages. The retaining wires 20, 21 fit the holes in the plate 16 somewhat loosely whereby the plates 16 can readily slide along the straight portions of the wires. The ends of the straight portions opposite the loops 20a, 21a extend outside of the plates 16 and may be slightly pinched or flattened as shown at 20b, 21b (Fig. 2) to prevent the wire 20, 21 from being withdrawn from the plates 16 after assembly.

The four rollers 16b of each unit are disposed in the spaces between the plates 16 and the retaining wires 20, 21 in such fashion that alternate rollers have their axes of rotation in planes at right angles to each other, as illustrated in Figs. 2 and 4, with the line of intersection of the planes parallel with the rails 14, 15. In order to insure that the holes in the plate 16 will register in assembling them with wires 20, 21, one of the corners of the plates is not cut whereby the plates may be assembled always in the same relation to each other. This feature makes it unnecessary to maintain high standards of spacing of the holes as it is only necessary that the diagonally opposite holes which receive one of the retaining wires be spaced fairly accurately apart. It is unnecessary that the holes for the retaining wires 20 be located symmetrically with respect to the holes for the retaining wires 21 with reference to Fig. 4 since the rollers 16b fit loosely between plates 16a and wires 20, 21.

Formerly it was the practice to make the rollers for the carriage bearings of hard metal like heat treated steel, the theory being that the steel rollers would wear better than softer rollers. In practice, however, this theory does not hold true, as it has been found, particularly with power operated typewriters, that hardened steel rollers tend to pit the rails. It is necessary that the rails be very rigid in order to support the carriage without excessive vibration and to guide it perfectly straight in its movement. For this reason, the rails are customarily made fairly heavy and rigid and cast iron has been used very extensively owing to the fact that it has the characteristics of rigidity, is easier to machine, and is slightly lighter in weight than machine steel. If machine steel were used for the rails, they would have to be very accurately machined, then heat treated, and finally straightened, and in all probability, ground after heat treatment owing to the warping which takes place in the heat treatment of steel. Thus a difficult problem is presented by the pitting of the rails which cannot be solved in a simple or inexpensive way, by merely changing the material of which the rail or the carriage is composed. Obviously, if soft steel were used, the pitting in all probability would be as bad as with cast iron and the rail would have to be made of greater cross sectional area to secure the necessary rigidity.

In order to retain the advantages of cast iron as the material for the rail, it has been found desirable to replace the steel rollers ordinarily used with rollers made of a fairly soft material, such as a moulded plastic. It has been found by experience that a plastic material now known in the art under the trade name of "Lucite" and chemically known as methyl methacrylate has the desired characteristics. This material is ordinarily transparent and closely resembles glass, but, unlike glass, it is quite soft and light. At the same time, it possesses sufficient resiliency to retain its shape under the sort of abuse to which the rollers of the carriage bearings are likely to be submitted in service. By practical test it has been found that when rollers are used in an assembly like that shown in Fig. 3, which are made of the thermoplastic material "Lucite," exceptional long life and practically no pitting of the rails results. These rollers have the further advantage in that they make the operation of the carriage much quieter since the carriage is now supported on a material which is resilient enough to have some sound deadening properties, as this material does not conduct sound nearly as readily as hard metals like cast iron and steel. Due to their resiliency the rollers are also capable of adjusting themselves to very slight irregularities in the rail and temporary obstruction such as small particles of dirt and gummy oil spots.

Aside from the use of a relatively soft plastic material for the rollers the bearing shown in Fig. 3 has other advantages. In the first place, the wires 20 and 21 are considerably more flexible than the usual rigid roller retainer now so commonly used in typewriting machines, whereby the units 16 are capable of a certain amount of torsional movement to accommodate for irregularities in the rails and are enabled to follow the grooves in the carriage and the rails more closely than would be the case if the rollers were fixedly pivoted on a relatively rigid structure. The plates 16 when assembled in the machine project quite close to the surface of the grooves in the carriage and the carriage rails whereby the plates have a certain amount of wiping action on the rails tending to spread the lubricant more effectively and to clear the rails of particles of material such as eraser chips which often clog the grooves.

Owing to the simplicity of assembly of the units 16 and to the use of wires 20, 21 it is a simple matter to accommodate the bearing to a carriage of any width. Another distinct advantage is that any wear that results in the bearing occurs in the rollers rather than in the rail or in the parts of the carriage in contact with the rollers. Thus, when the carriage bearings become worn, it is not necessary to replace either the rails or the carriage, but merely replace the rollers 16b. These rollers, since they do not have to be hardened and ground, but may be cut from round stock, may be very cheaply manufactured and cost only a few cents to replace as compared with the replacement of the rail which is quite an expensive part owing to the necessity for accurate machining.

Another advantage of the bearing described herein is that owing to the thinness of the wire retainers 20 and 21, the rollers 16b may be made wider than is usually possible with conventional forms of roller retainers. Ordinarily the rollers used in carriage bearings are quite narrow in relation to the faces of the grooves in the rails and the carriage. Since the wires and plates 16a merely loosely hold the rollers 16b in place, the rollers may adapt themselves to the surfaces with which they contact whereas in prior forms of bearings the rollers were mounted on relatively rigid pivots and were incapable of any appreciable amount of accommodation.

While there has been shown and described and pointed out the fundamental novel features of the invention as applied to a single embodiment it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A bearing comprising two coacting straight grooved members forming a raceway, a plurality of separator plates disposed at right angles to the raceway, a straight row of anti-friction rollers freely loosely received in said raceway and merely spaced by said plates, and means to loosely hold said plates and said rollers in alignment longitudinally of the raceway.

2. A bearing comprising two grooved members with the grooves in said members confronting each other to form a space to receive a bearing unit; and a bearing unit comprising a series of spaced plates having their planes at right angles to the length of the space formed by the grooves, said plates having generally the shape in cross-section of the space between said grooves, rollers located between said plates, and means to loosely hold said plates in alignment, said plates being free to move a limited extent longitudinally of the space and being maintained spaced distances apart by said rollers, said rollers being free to move laterally of said space in the direction of contact with the walls of the grooves.

3. A bearing comprising a pair of coacting raceway elements, a series of separator plates located in the raceway between said elements, means to loosely hold said plates in alignment, and anti-friction rolling members loosely removably received in the spaces between said separator plates and engaging the raceway elements.

4. A bearing comprising a track and a sliding element; and an anti-friction bearing unit between the track and sliding element, said unit comprising a series of anti-friction rolling elements, a series of retaining elements loosely separating but not supporting the anti-friction elements, and means for loosely slidably holding the retaining elements in alignment, said last named means being adapted for loosely pivotally joining a plurality of the anti-friction units in a train.

5. A bearing comprising a fixed element and a movable element, both shaped to form a bearing race; and a bearing unit in said race comprising a series of anti-friction rollers arranged in said race with their axes of rotation alternately at right angles, means to loosely space said rollers apart in said race, and means to align both said rollers and said spacing means and adapted at each end of said unit for pivotally interconnecting a plurality of said units in a train.

6. A bearing comprising two coacting members forming a race; and a bearing unit in said race comprising a plurality of anti-friction rollers in said race, spacing means for said rollers consisting of square flat plates provided with holes at the corners, and a pair of U-shaped retaining members passing through said holes to align said plates and said rollers, each of said U-shaped members passing through diagonally opposite holes and said members being introduced to said plates from opposite ends of said unit, whereby the bend of the U serves as a loop for pivotally interconnecting a plurality of said units in a train.

7. A bearing comprising two coacting elements forming a bearing race, a cage formed of a series of separators and a plurality of separate means to loosely slidably align said separators and to hold the end separators, and anti-friction rolling elements located between the separators, said rolling elements and separators mutually spacing each other apart, said aligning means being shaped to couple several cages in a train.

8. A bearing including a fixed element and a movable element formed with a race between, a series of anti-friction rolling elements in said race, and a cage for loosely holding said elements comprising a series of separator elements between which the rolling elements are retained and means to hold the end separator elements not more than a fixed distance apart and also to loosely hold the intermediate separator elements in alignment, said rolling elements also spacing the separator elements.

9. A bearing comprising elements forming a bearing race, anti-friction rolling elements in said race; and a cage for said elements comprising a series of spacing elements which loosely space said rolling elements apart and which in turn are loosely spaced apart by said rolling elements, and retaining wires on which said spacing elements are strung, said retaining elements limiting separation of the rolling elements and spacing elements to an extent permitting free rotation of the rolling elements in said cage.

CARLTON T. JACKSON.